UNITED STATES PATENT OFFICE.

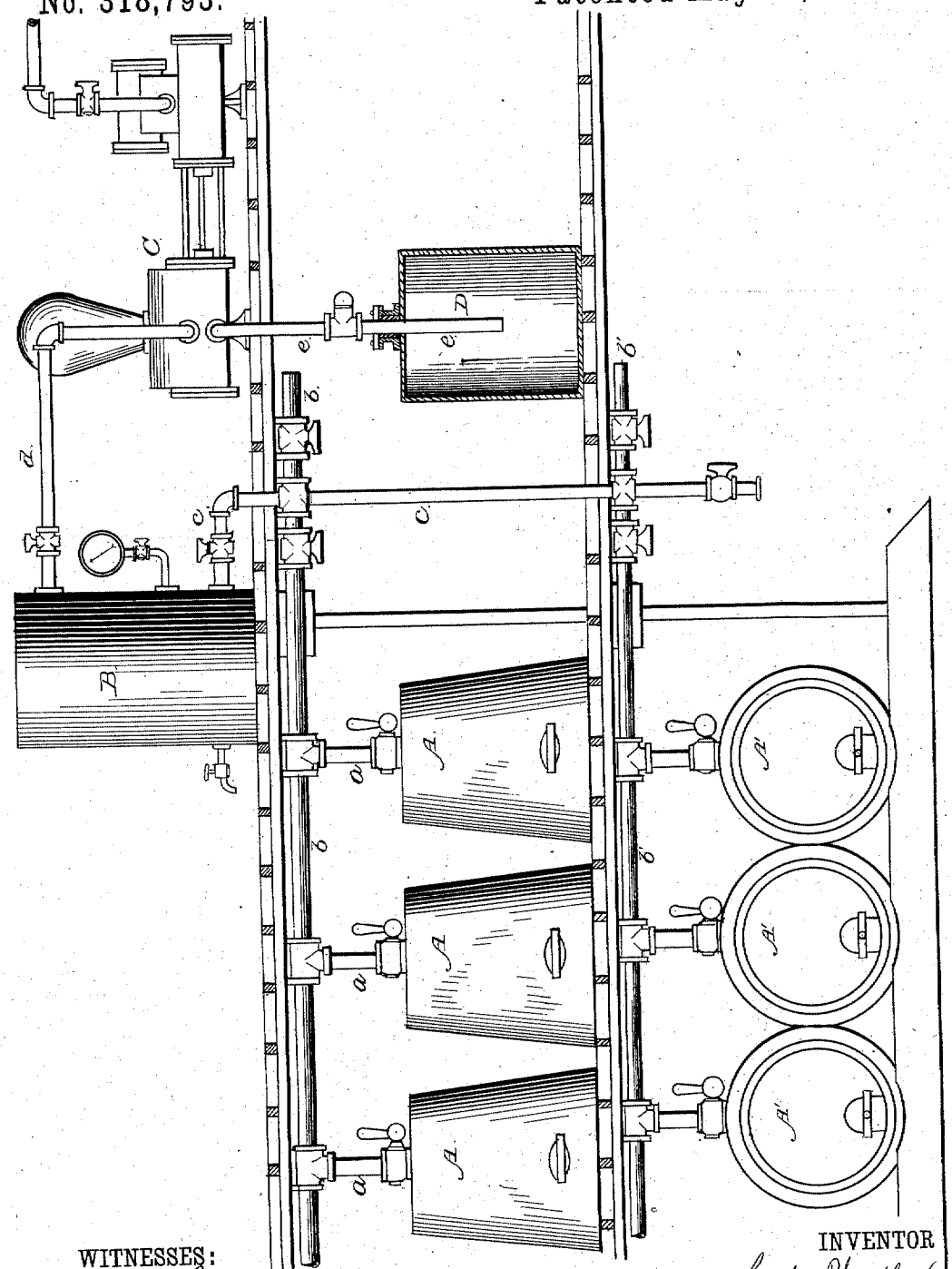

CASPER PFAUDLER, OF ROCHESTER, NEW YORK.

ART OF MAKING CERTAIN FERMENTED BEVERAGES.

SPECIFICATION forming part of Letters Patent No. 318,793, dated May 26, 1885.

Application filed September 13, 1884. (No specimens.)

*To all whom it may concern:*

Be it known that I, CASPER PFAUDLER, a citizen of the United States, residing at Rochester, in the county of Monroe and State of New York, have invented certain new and useful Improvements in the Art of Making Certain Fermented Beverages; and I hereby declare the following to be a full, clear, and exact description of the same.

My invention relates to the class of fermented beverages which, after the main fermentation has been completed, are subjected to a prolonged and slow secondary fermentation at a low temperature for the purpose of giving to them certain essential qualities. This stage of prolonged after-fermentation is commonly designated in the art of making such fermented beverages the "aging" or "ripening" stage; but the term "aging" as thus used is not to be confounded with the same term as applied to distilled liquors in which no fermentation takes place after the main fermentation, the objects sought and the results obtained being widely different.

The approved methods of making the class of fermented beverages to which this invention relates contemplate a temperature in the storage and finishing cellars of about from 30° to 50° Fahrenheit; and the terms "low temperature," "cool atmosphere," and similar expressions which occur in the present specification are used to imply about the ordinary temperature of such cellars. The beverages which in their manufacture are caused to undergo this prolonged secondary fermentation are certain kinds of beer, notably the kind of beer chiefly manufactured in the United States, and commonly called "lager-beer," certain kinds of ale, and also certain kinds of wine; but whatever the beverage may be, it has been found necessary heretofore, in order to obtain the best results, to cause the after-fermentation to continue for a period of many months, and in some cases even for years. All fermented beverages (the term being used in contradistinction to distilled liquors) immediately after having undergone the main fermentation are more or less crude and turbid, certain foreign particles always remaining suspended in the liquid. With beverages of this kind intended for immediate consumption it has been deemed necessary only to overcome the turbidity of the beverage, which may be effected by a rapid settling of the suspended yeast and other foreign particles. This hasty preparation is sometimes called "maturing" the beverage, and appears to have been practiced in the cases of cider, certain spirits, and beer or ale of a kind made chiefly in England, which passes almost immediately from the main fermenting-vats to the consumer. With superior fermented beverages, however, a much more extended and elaborate treatment is required to relieve them from the crudity which always belongs to freshly-fermented worts. It is to this end that the beverage is caused to undergo the prolonged and slow secondary fermentation above referred to, by which it gradually ripens and becomes mellow, and the great length of time heretofore required for this purpose has been a potent factor in rendering the beverage costly.

One of the primary objects of my invention is to obtain with beverages of the character referred to, in a period of time very much shorter than has been found necessary with the methods heretofore practiced, all the effects of aging or ripening by a prolonged and gentle after-fermentation.

To this end the leading feature of my invention consists in accelerating the aging or ripening of such beverages as require to undergo after-fermentation to impart to them certain essential properties by inclosing the beverage, after it has undergone the main fermentation, in a close vessel surrounded by a cool atmosphere and abstracting from the vessel the atmospheric air, and also the gaseous products of fermentation as they accumulate in the upper part of the vessel until the beverage attains the required condition. In other words, it consists in causing the beverage to undergo the requisite secondary fermentation under a partial vacuum, the air and gases being withdrawn by means of an exhaust-pump from the vessel containing the beverage until the latter reaches the condition required.

The most important application of my invention in the United States is to the manufacture of so-called "lager-beer," which is a product of bottom or lower fermentation, and I shall therefore describe my process particularly as applied to the production of that beverage.

The manufacture of beer under the modern and most approved practice has heretofore been conducted substantially in the following manner: After the wort has been formed and boiled with hops in the well-known way, it is cooled, transferred to open vats, and fermented with the aid of yeast. This is the main fermentation, to which all the subsequent treatment is subordinate, and it usually lasts variously from seven or eight to twenty days, depending upon temperature, the quality desired as to the product, and other conditions. When the beer has spent itself in the open vats, and carbonic-acid gas is formed only in relatively small quantities, the foam subsides, the yeast settles to the bottom of the vat, and the first or main fermentation is said to be over. When the beverage reaches this stage, it is distinctively beer; and it was formerly the custom to treat it no further, but to transfer it to the "ruh" or storage casks, and sell it directly from these casks, after giving it more or less time to ripen. In the modern art, however, much has been done toward giving luster and life to the beverage, and it accordingly undergoes elaborate and delicate treatment between the times of introducing it into the storage-casks and of finally racking it off for the market.

In all cases heretofore it has been found necessary in order to obtain the best results to allow the beer to remain in the ruh casks for a period of several months, since in this stage the beer ripens and becomes mellow under a slow and gentle fermentation at a low temperature, and thus obtains properties without which it would be rejected as not reaching the required standard. In other words, in the ruh or storage casks the beer passes through the essential step of aging or ripening under a slow secondary fermentation before referred to. After the beer has laid a sufficient time in the storage-casks, (which casks have hitherto been left open at the bung-hole sufficiently to allow the slowly-rising gas to escape into the open air,) it is in the modern practice of the brewer transferred to the "shavings-casks," which are large casks containing shavings of some hard but porous wood. The beer when it goes into the shavings-casks is of course somewhat flat—that is, inadequately charged with carbonic-acid gas to be palatable. It is also more or less turbid in appearance, and the object of treating it in the shavings-casks is to give it both luster and life. For this purpose young beer, or "kraeusen" from the open vats containing beer in the highest stage of the main fermentation, is added to the beer in the shavings-casks, which then ferments afresh with considerable activity. Gelatinous matter is usually introduced into these casks as a clarifying medium to cause the impurities to settle down among the shavings. Within the past few years important improvements have been made in the treatment of beer in this so-called "kraeusen" stage by means of what are termed "bunging apparatuses," applied to the casks immediately upon the introduction of the kraeusen or soon after. The effect of these bunging apparatuses is to allow the self-generating carbonic-acid gas to escape at a predetermined pressure, and they prevent loss of beer, hasten the time of finishing, avoid contamination of the atmosphere of the cellars, and are thought to improve the quality of the product. They do not, however, enable the brewer to dispense with shavings, which constitute an expensive item in brewing, for two reasons: first, owing to their initial cost and the time and labor expended in handling and applying them, and, secondly, because the beer at the bottom of the shavings-casks in immediate contact with the shavings is not in a condition to be drawn off for the market, being mixed with impurities. Besides this, they impart a slight flavor to the beer which some people find unpleasant.

A second object of my invention as applied to beer is to render the use of shavings unnecessary and to hasten the finishing.

By my improved process the beverage after having undergone the main fermentation is transferred to storage-casks in cold cellars, the casks are closed to exclude the atmosphere, and an exhaust air-pump is applied to the casks, either singly or in groups, thus creating and maintaining a rarefied atmosphere within the casks. In this way the rising carbonic-acid gas is pumped out as it accumulates in the upper part of the vessel; and it is found that this freedom of escape afforded to the gas and absence of pressure upon the beverage greatly accelerate the action, and cause the beer to attain the most desirable condition in a remarkably short time. Beer thus treated has in a period of from ten to fourteen days acquired a quality that could not have been imparted to it if treated by the old process in less than three or four months.

It has been claimed by some for a great many years past that advantages are secured by conducting the main fermentation of a wort *in vacuo*, or under a diminished atmospheric pressure, though no such practice appears to be recognized in the general art of brewing. It was also suggested as early as the year 1859, in England, that for the purpose of "maturing" spirits, cider, or beer the liquid, after having undergone the principal fermentation, might with advantage be held under a partial vacuum for a brief period—twenty-four hours, or thereabout. The maturing referred to, however, is obviously in no sense analogous to the hastening of the aging or ripening by after-fermentation, first, because the time named is by far too short to produce any perceptible effect in the way of aging or ripening, and, secondly, because the object sought is one common also to spirits and cider. The kind of beer presumably thus treated and the purpose of the treatment have already been referred to, My process of aging or ripening is to be clearly distinguished from the foregoing. It does not relate to the main fermentation, which may be conducted in open vats in the usual way, (and this is the method which I employ;) or it may be conducted under a rarefied atmosphere if this should be rendered practicable, or in any other suitable way. Neither does it relate to beverages intended to be ready for consumption directly after the completion of the main fermentation; but it relates to those beverages which, after the completion of the main fermentation, are allowed to remain for a considerable time in a state of quiescence in the "ruh," "storage," or "larger" casks, variously so called, in a cold atmosphere, to undergo the necessary aging and ripening by after-fermentation. So far as I am aware this ripening or aging process has never heretofore been conducted in a rarefied atmosphere, nor has it ever been known that it could be so conducted with advantage.

By my improved process, when applied to beer, the beverage is also treated under a rarefied atmosphere in the final or finishing stage after leaving the ruh casks—that is to say, kraeusen is added to the beer, preferably with "finings," but either with or without shavings in the casks. The latter are sealed as the former ones were, and the exhaust-pump is applied also in the same manner.

Under the method of treatment last described the beer becomes fine and bright in a greatly-reduced period of time, and when it has attained the desired condition a bunging apparatus may be applied in the usual way, to saturate it with carbonic-acid gas and prevent "overbunging." It will thus be seen that the exhausting process may be applied with advantage to either of the two stages of manufacture above designated; but it is preferable to apply it to both.

In the accompanying drawing, which represents a front view partly in section of an apparatus for carrying my invention into effect in the manufacture of beer, A A' designate the storage vats or casks and the finishing-casks. A convenient relation as to position is that represented in the drawing, in which the vats or casks A may be regarded as the ruh or storage casks, and the casks A' as the finishing or shavings casks. These vessels are wholly closed, except that each of them connects by a pipe, $a$ or $a'$, with a pipe, $b$ or $b'$, and the pipes $b$ $b'$ connect by a pipe, $c$, with a close tank, B, which connects by a pipe, $d$, with an air-pump, C. The discharge-pipe $e$ of the air-pump leads into a storage-vessel, D. All the pipes are provided with suitable stop-cocks, which require no further description. The vessels A or A', as the case may be, having been filled with beer in the proper condition, as hereinbefore defined, preferably nearly to their tops, the respective stop-cocks are opened to establish communication between the upper parts of the vessels and the tank B. When the air-pump is set in motion, the air in the tank and in the vessels is rarefied, and the carbonic-acid gas which rises in the fermenting-vessels is drawn into the vacuum-tank B, and thence sucked out and driven into the storage-vessel D. In this way the carbonic-acid gas may be saved for use in the arts, if desired. Where the casks will endure the strain, I prefer to exhaust to a pressure equal to twenty inches and upward of mercury, since the saving of time is in a great measure proportionate to the degree of vacuity maintained, and the quality of the product is also largely dependent upon the same thing; but more or less of the benefits of the process are obtained with almost any degree of rarefaction. The tank B causes an equality and uniformity of pressure in all the vessels.

The benefits derived from the use of my process are almost beyond estimate. Not only is the time consumed in manufacturing reduced to a degree that was never before deemed possible, but a better quality of beer is produced than when made by the old method. Moreover, great benefit accrues to the beer by reason of the exclusion of the foul atmosphere of the cellars and vaults, the tendency of which is always to contaminate it more or less and produce deterioration of the beverage.

What I claim as new, and desire to secure by Letters Patent, is—

1. In the manufacture of fermented beverages of the kinds which are subjected to a prolonged secondary fermentation for the purpose of aging or ripening them, the process of accelerating such aging or ripening, which consists in inclosing the beverage, after it has undergone the main fermentation, in a vessel surrounded by a cool atmosphere, and abstracting the atmospheric air and the gaseous products of fermentation as they accumulate in the upper part of the vessel until the beverage attains the desired condition, substantially as described.

2. In the manufacture of beer of the kinds which are subjected to a prolonged secondary fermentation for the purpose of aging or ripening them, the process of accelerating such aging or ripening, which consists in inclosing the beverage, after it has undergone the main fermentation, in a vessel surrounded by a cool atmosphere and abstracting the gaseous products of fermentation as they accumulate in the upper part of the vessel until the beverage attains the desired condition, substantially as described.

3. In the manufacture of beer by bottom or lower fermentation, the process of accelerating the ripening of the beverage after it has passed through the main fermentation, which consists in inclosing it in a storage-vessel and maintaining in the vessel a rarefied atmosphere and abstracting the gaseous products of fermentation as they accumulate, substantially as described.

4. In the manufacture of beer, the process of accelerating the finishing and clarifying of the beverage after it has passed through the aging or ripening process in the storage-casks, which consists in inclosing it in a vessel, exciting in it a new fermentation, maintaining in the vessel a rarefied atmosphere, and abstracting the accumulating gaseous products of fermentation, substantially as described.

5. The process of making beer which consists in first fermenting the wort, then inclosing the beverage in vessels and maintaining in the said vessels a rarefied atmosphere, thereby accelerating the after-fermentation and aging; then transferring the beverage from the last-named vessels to the finishing-casks and maintaining it therein under a rarefied atmosphere, and finally bunging the cask to saturate the beverage with the requisite quantity of self-generated carbonic-acid gas, substantially as described.

CASPER PFAUDLER.

In presence of—
  C. C. PUFFER,
  E. G. MINER, Jr.

It is hereby certified that in Letters Patent No. 318,793, granted May 26, 1885, upon the application of Casper Pfaudler, of Rochester, New York, for an improvement in the "Art of Making Certain Fermented Beverages," errors appear in the printed specification requiring correction as follows: In line 15, page 3, the word, "larger," should read *lager;* in line 29, same page, the *period* after the word "casks" should be omitted, and the following word "The" read *the*, thus making the sentence continuous; and that the Letters Patent should be read with these corrections therein, to make it conform to the records of the case in the Patent Office.

Signed, countersigned, and sealed this 16th day of June, A. D. 1885.

[SEAL.]

H. L. MULDROW,
*Acting Secretary of the Interior.*

Countersigned:
M. V. MONTGOMERY,
*Commissioner of Patents.*